US009648131B2

(12) United States Patent
Sundaram et al.

(10) Patent No.: US 9,648,131 B2
(45) Date of Patent: May 9, 2017

(54) CONNECTION INSIGHTS WIDGET

(71) Applicant: LinkedIn Corporation, Mountain View, CA (US)

(72) Inventors: Senthil Sundaram, South San Francisco, CA (US); Rahul Agarwal, Sunnyvale, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 262 days.

(21) Appl. No.: 14/448,966

(22) Filed: Jul. 31, 2014

(65) Prior Publication Data

US 2016/0034461 A1    Feb. 4, 2016

(51) Int. Cl.
*G06F 17/30* (2006.01)
*G06F 7/00* (2006.01)
*H04L 29/08* (2006.01)
*G06Q 50/00* (2012.01)

(52) U.S. Cl.
CPC ...... *H04L 67/306* (2013.01); *G06F 17/30522* (2013.01); *G06Q 50/01* (2013.01)

(58) Field of Classification Search
CPC .......................... H04L 67/306; G06F 17/30522
USPC ....................................................... 707/732
See application file for complete search history.

(56) References Cited

U.S. PATENT DOCUMENTS

| | | | | |
|---|---|---|---|---|
| 7,877,266 B2* | 1/2011 | Brydon | ................ | G06Q 10/063 705/1.1 |
| 8,386,301 B2* | 2/2013 | Rajasingham | ... | G06Q 10/06393 705/7.38 |
| 8,554,794 B2* | 10/2013 | Brydon | ................ | G06Q 10/107 707/785 |
| 2011/0196802 A1* | 8/2011 | Ellis | .................. | G06F 17/30654 705/321 |
| 2011/0196924 A1* | 8/2011 | Hargarten | ............... | G06Q 30/02 709/204 |
| 2012/0066202 A1* | 3/2012 | Hatazawa | ......... | G06F 17/30864 707/710 |
| 2012/0182431 A1* | 7/2012 | Asanov | ............... | G06F 19/3481 348/207.1 |
| 2013/0018871 A1* | 1/2013 | Mehta | ............... | G06F 17/30554 707/723 |
| 2013/0097182 A1* | 4/2013 | He | ....................... | G06F 17/3071 707/748 |
| 2013/0185654 A1* | 7/2013 | Harris | ..................... | H04W 8/18 715/753 |

(Continued)

*Primary Examiner* — Pavan Mamillapalli
(74) *Attorney, Agent, or Firm* — Schwegman Lundberg & Woessner, P.A.

(57) ABSTRACT

Techniques for enhancing search results generated by a search engine are described. A first set of member profiles is identified, the first set of member profiles satisfying a search query initiated by a searcher. A second set of member profiles is identified, the second set of member profiles having a relationship between a profile of the searcher and each of the second set of member profiles. A subset of the second set of member profiles is selected based on strength of relationships between each of the subset of the second set of member profiles and the first set of member profiles. A portion of each of the first set of member profiles is communicated for presentation in a first region of a search results user interface and a portion of each of the subset of the second set of member profiles is communicated for presentation in a second region of the search results user interface.

20 Claims, 8 Drawing Sheets

(56) References Cited

U.S. PATENT DOCUMENTS

| | | | |
|---|---|---|---|
| 2013/0212494 A1* | 8/2013 | Heiferman | G06Q 10/1095 715/753 |
| 2013/0254213 A1* | 9/2013 | Cheng | G06Q 50/01 707/748 |
| 2013/0254305 A1* | 9/2013 | Cheng | H04L 51/32 709/206 |
| 2015/0127565 A1* | 5/2015 | Chevalier | G06Q 10/00 705/319 |

* cited by examiner

CONNECTION INSIGHTS WIDGET

TECHNICAL FIELD

The present disclosure generally relates to data processing systems and information search engines. In one specific embodiment, the present disclosure relates to supplementing search results with information pertaining to influential connections of a searcher.

BACKGROUND

Online social network services provide users with a mechanism for defining, and memorializing in a digital format, their relationships with other people and other entities (e.g., companies, schools, etc.). This digital representation of real-world. relationships and associations is frequently referred to as a social graph. There are a variety of web-based applications and services that implement and maintain their own social graph, and still more applications and/or services that leverage the social graph of a third-party social network service (e.g., via publically available application programming interfaces, or APIs). The number and variety of applications and services that leverage a social graph maintained by a social network service is seemingly endless. For instance, a variety of messaging and content sharing applications leverage a social graph to establish user privileges for sharing content with, or accessing the content of others.

In addition to maintaining a social graph, many social network services maintain a variety of personal information about their members. For instance, with many social network services, when a user registers to become a member and/or at various times subsequent to registering, the member is prompted to provide a variety of personal or biographical information, which may be displayed in a member's personal web page. Such information is commonly referred to as personal profile information, or simply "profile information," and when shown collectively, it is commonly referred to as a member's profile. For instance, with some of the many social network services in use today, the personal information that is commonly requested and displayed as part of a member's profile includes a person's age, birthdays, gender, interests, contact information, residential address, home town and/or state, the name of the person's spouse and/or family members, and so forth. With certain social network services, such as some business or professional network services, a member's personal information may include information commonly included in a professional resume or curriculum vitae, such as information about a person's education, the schools, colleges or universities that the member attended, the company at which a person is employed, an industry in which a person is employed, a job title or function, an employment history, skills possessed by a person, professional organizations of which a person is a member, and so on.

Because social network services are a rich source of information about people and their relationships with other people, social network services are an extremely useful tool for performing certain tasks. For example, just as a telephone directory, phone book, or white pages previously served as the go-to source for basic information about people, contemporary social network services serve as a far richer directory of people. Many people use social network services to search for member profiles of friends, colleagues, classmates, and other people they may know, or want to know. Accordingly, many social network services provide a search engine to facilitate searching for the member profiles of members of the social network service. However, because social network services have so many members, finding one or more of the best search results, corresponding to a search query, is often difficult

DESCRIPTION OF THE DRAWINGS

Some embodiments are illustrated by way of example and not limitation in the FIGS. of the accompanying drawings, in which..

DETAILED DESCRIPTION

Figure 1:
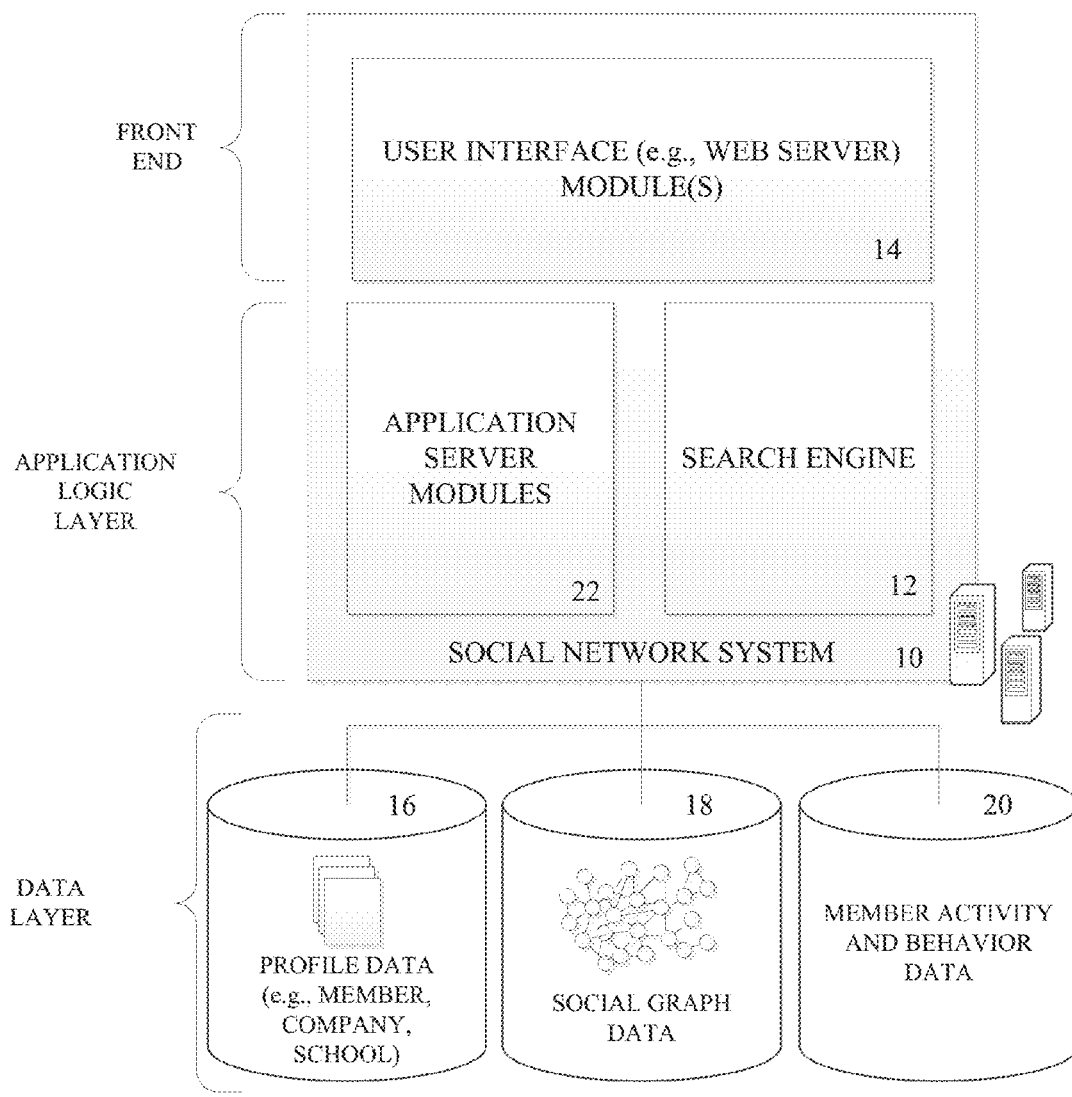
FIG. 1 is a block diagram of the functional modules or components that comprise a computer-network based social network service; including a search engine consistent with some embodiments of the invention.

The present disclosure describes methods, systems and computer program products for enhancing search results corresponding to a search query. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

A recruiter who is searching for potential candidates to fill a job opening may perform various searches of a social networking system. For example, if the recruiter is looking for candidates to fill a position having a title of Data Scientist, the recruiter may submit a query that includes the keyword phrase "data scientist," The recruiter may then be presented with a list of search results including information pertaining to candidates having member profiles matching the keyword phrase. The list may be ordered based on various ranking criteria, as is described in more detail below. However, despite being presented with a ranked list of search results, the recruiter may not know which of the results correspond to candidates who would be most likely to respond to a message from the recruiter pertaining to a job posting that the recruiter seeks to fill. Furthermore, there may be additional potential candidates pertaining to the search query that would likely to respond to messages from the recruiter despite not being ranked highly in the search results. For example, candidates not in a close social sphere of the recruiter (and thus not as highly ranked as others), but who are connected to other members who are within the close social sphere of the recruiter, may be more likely to respond than others. Thus, the recruiter would benefit from having additional insights into the search results based on such information maintained with respect to the social networking system.

In various embodiments, when search results corresponding to a search query are presented to a searcher (e.g., a recruiter), additional information pertaining to the search results is presented to the searcher. This additional information may include, for example, information pertaining to connections of the searcher who know the most number of members corresponding to the search results. These connections may be identified to the searcher (e.g., in a user interface region separate from the user interface region in which the search results are presented, such as a "connections insight widget") as "search results referrals" or "influential connections". Thus, for example, the searcher may be notified that a first connection of the searcher knows 15 of the members corresponding to the search result and a second connection of the searcher knows 7 members corresponding to the search result. The searcher may also be able to access the member profiles of these influential connections to identify additional potential candidates who may or may not have been ranked highly in the search results. Additionally, the searcher may be able to reach out to the influential connections for more information pertaining to a subject matter of the search that the recruiter is conducting. In various embodiments, influential connections specific to a set of search results may be identified by various factors, including the number of connections each influential connection has to the members corresponding to the search results, a reputation that the influential connection has on the social networking site (e.g., a total number of connections of the influential connection), an expertise that the influential connection has with respect to the subject matter of the search query (e.g., as derived from a member profile of the influential member), and so on. Such factors may be weighted based on their relevance to the searcher (e.g., based on preferences of the searcher).

In various embodiments, a first set of member profiles is identified, the first set of member profiles satisfying a search query initiated by a searcher. A second set of member profiles is identified, the second set of member profiles having a relationship between a profile of the searcher and each of the second set of member profiles. A subset of the second set of member profiles is selected based on strengths of relationships between each of the subset of the second set of member profiles and the first set of member profiles N portion of each of the first set of member profiles is communicated for presentation in a first region of a search results user interface and a portion of each of the subset of the second set of member profiles is communicated for presentation in a second region of the search results user interface. Other advantages and aspects of the present inventive subject matter will be readily apparent from the description of the figures that follows.

FIG. 1 is a block diagram of the functional modules or components that comprise a computer- or network-based social network service 10, including a search engine 12 consistent with some embodiments of the invention. As shown in FIG. 1, the social network system 10 is generally based on a three-tiered architecture, comprising a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, a description, industry, employment history, skills, professional organizations, and so on. This information is stored as part of a member's member profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generates various user interfaces (e.g., web pages) with data retrieved from various data sources in the data layer. With some embodiments, individual application server modules 22 are used to implement the functionality associated with various applications, services and features of the social network service. For instance, a messaging application, such as an email application, an instant messaging application, or some hybrid or variation of the two, may be implemented with one or more application server modules 22. Of course, other applications or services may be separately embodied in their own application server modules 22.

The social network service may provide a broad range of applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in a database (not shown). When a member joins a group, his or her membership in the group will be reflected in the social graph data stored in the database with reference number 18. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 18.

In addition to the various application server modules 22, the application logic layer includes a search engine 12. As illustrated in FIG. 1, with some embodiments the search engine 12 is implemented as a service that operates in conjunction with various application server modules 22. For instance, any number of individual application server modules 22 can invoke the functionality of the search engine 12. However, with various alternative embodiments, the search engine 12 may be implemented as its own application server module such that it operates as a stand-alone application. With some embodiments, the search engine 12 may include or have an associated publicly available application programming interface (API) that enables third-party applications to invoke the functionality of the search engine 12. With some embodiments, the search engine 12 may be a people-search engine, and provide functionality to search for people (e.g., member profiles) specifically. Alternatively, the search engine module 12 may facilitate searching for any type of information entity (e.g., people or member profiles, companies, schools and other educational institutions, etc.) that is maintained and used by the various applications of the social network system, such as companies, groups, job listings, etc. With such an embodiment, the user performing the search may specify the type of entity to be searched for. Alternatively, the search engine may algorithmically identify the type of search being performed, for example, based on the search query.

As described in greater detail below, in general, the search engine 12 uses a ranking algorithm that boost or increases the ranking scores assigned to certain of the member profiles satisfying the search query when those member profiles share one or more particular attributes or characteristics in common with the member profile of the member performing the search. For example, with some embodiments, the ranking algorithm will increase the ranking score assigned to those member profiles satisfying the search query and having a profile attribute indicating the member is employed at the same company as the member performing the search. Accordingly, if the member profile of the member performing the search indicates that the member is currently employed at ACME Products, any member profile that satisfies the search query and also indicates that the member is employed at the same company that is, ACME Products will have its ranking score adjusted upward or otherwise calculated or derived to reflect this shared member profile attribute. Accordingly, with all else equal, if two member profiles for two different persons with the same name, (e.g., John Doe) differ in that one of the members is employed at the same company as the member performing the search, and the other member is employed at some other company; the member profile of the member employed at the same company as the searching member will be assigned the higher ranking score, and thus be presented more prominently in a list of search results.

Figure 2:
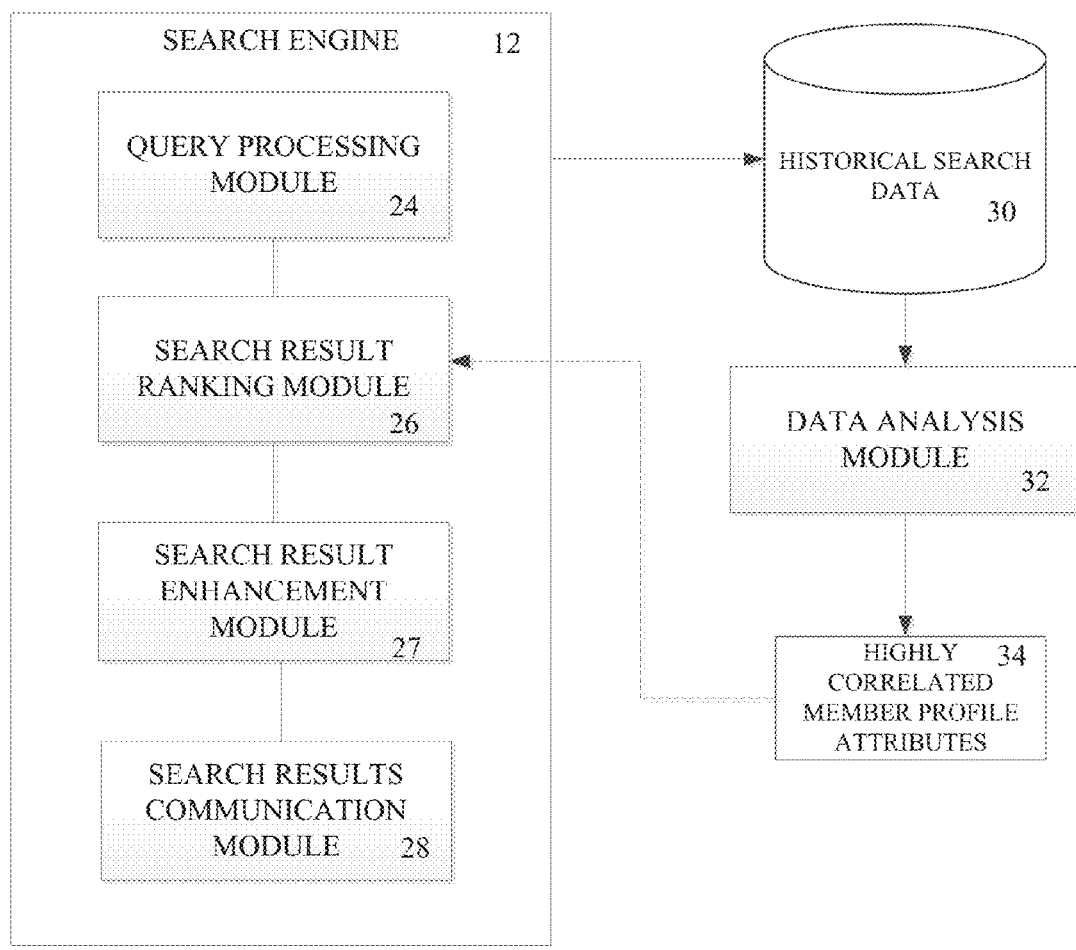
FIG. 2 is a functional block diagram of a search engine, consistent with some embodiments of the invention.

FIG. 2 is a functional block diagram of a search engine, consistent with embodiments of the invention. As illustrated in FIG. 2, the search engine 12 includes a query processing module 24, a search results ranking module 26 and a search results presentation module 28. In general, the query processing module 24 receives a search query and then processes the search query by selecting or otherwise identifying data in a database (e.g., a searchable index) that satisfies the search query. Depending upon the nature of the search query, one of several matching rules may be evaluated to identify the member profiles that match the query. For example, if the search query is first and last name, the search query is processed by selecting the relevant records from a database having names in the appropriate database field that match, exactly or partially, the name specified in the search query. If the search query specifies some other member profile attribute, in addition to or instead of a first and/or last name, a particular matching rule for that member profile attribute may be evaluated to identify member profiles that satisfy the query. For instance, the search query may be a first and/or last name. Alternatively, in some instances, the search may specify one or more other member profile attributes, to the exclusion, or in addition to, a name. For instance, a search query may include any combination of the following member profile attributes: name (first and/or last); geographical information, including country, state, city, postal code, including proximity to any of the aforementioned; job title; company of current or previous employment; school attended; industry of employment; groups of which one is a member; languages spoken; job function; company size; skills possessed; relationship to person initiation the search (e.g., first degree connection, second degree, and so forth); interests; experience or seniority level; as well as many others. The query processing module 24, using the received search query, identifies a set of member profiles satisfying the search query.

The search results ranking module 26 derives for each search result (e.g., member profile) a ranking score representing a measure of relevance, particularly, in view of both the search query and the particular member who has invoked or initiated the search. With some embodiments, the ranking algorithm may utilize any number of input signals for use in deriving a ranking score, where one or more signals are combined in some way (e.g., multiplied or added together) to derive an overall ranking score. Consistent with embodiments of the invention, at least one of those input signals or component scores represents the extent to which certain member profile attributes are shared in common between a member profile in the search results and the member profile of the member who has initiated or invoked the search. Accordingly, when the query processing module identifies or selects the database records representing the member profiles that satisfy the search query, certain member profile attributes may also be retrieved for the purpose of comparing those member profile attributes with the corresponding member profile attributes of the member who has initiated or invoked the search. Depending upon the particular member profile attributes in consideration, a particular matching rule may be evaluated to determine the extent to which two members have similarity with respect to the particular member profile attribute.

With some embodiments, the ranking module 26 may have multiple ranking algorithms for use in generating ranking scores. Accordingly, a particular ranking algorithm may be selected and used depending upon the type of search query that has been received, or the specific member profile attributes that have been specified as part of the search query. For instance, if the search query is determined to be a simple name search (e.g., first and/or last name), a particular ranking algorithm for use with that type of search query might be selected and used to derive and assign ranking scores to the search results. However, if the search query specifies a particular member profile attribute, then a different ranking algorithm may be selected and used in deriving and assigning ranking scores. In general, a ranking algorithm used by the ranking module may include any number of weighting factors, which may vary depending upon the search query type, and the specific member profile attribute types that have been specified as part of the search query. The following example is illustrative.

Presume for sake of an example that a member of the social network service residing in Detroit, Mich. desires to reach out and make contact with a former college classmate known to now reside in Seattle, Wash. The searching member generates a search query specifying both the first and last name of the college classmate and specifies as a search parameter the location, "Seattle, Wash." Because the search query specifically indicates a geographical location that is different from the searcher's geographical location, the ranking algorithm selected for use in deriving ranking scores for the search results should not promote or otherwise boost the relevance scores assigned to member profiles as a result of those member profiles indicating that a member lives in the same location (i.e., Detroit, Mich.) as the member performing the search. Furthermore, presume for a moment that the member residing Detroit attended college in Seattle, Wash. Because the query has specified the geographical location, Seattle, Wash., and because the searching member attended college in Seattle, Wash., those member profiles matching the query and specifying attendance or graduation from the same college as the searching member may be boosted in the search results ranking. For instance, the ranking module may weight more heavily any member profile in which the member has indicated attendance at, or graduation from, the same university as the searching member. In essence, by specifying a particular member profile attribute (in this example, a geographical location), another member profile attribute (e.g., college/university attended) is weighted more heavily in the ranking algorithm to reflect the presumed importance of a member profile that has as an attribute a college or university that is the same as the member performing the search.

Once the search result ranking module 26 has generated and assigned to each search result a ranking score, the search result enhancement module 27 may perform additional actions to enhance the search results. For example, as is described in more detail below, the search result enhancement module 27 may identify an additional set of member profiles having relevance to the search results, such as member profiles corresponding to members having the most number of connections to the member profiles included in the search results. In this way, the searcher may be able to gain additional insight into the search results, such as by viewing a profile of one of the identified most influential connections of the searcher (including information pertaining connections of this influential connection) or reaching out to particular members who may have special knowledge pertaining to the search results, The search results presentation module 28 causes the search results to be presented, arranged in order of their assigned ranking score, in a user interface. For instance, the user interface may be a search results page providing a simple list of at least a portion of the member profiles that satisfied the query. Alternatively, in some instances, the user interface may operate in conjunction with the query processing module 24 and the search results ranking module 26 to implement an incremental search technique whereby search results are presented while a member is typing in the search query. Such results may be presented, for example, in a drop down suggestion list, or directly in a portion of a search results web page. Additionally, in various embodiments, the search results presentation module 28 causes additional information pertaining to the search results to be presented (e.g., in a separate portion of the search results web page, such as a profile insights widget). For example, the search results presentation module 28 may present at least a portion of one or more additional member profiles corresponding to members of the social networking system who may have special knowledge pertaining to the search results (e.g., as judged by a number of connections each of the additional member profiles have that correspond to the search results, reputations of the additional members, expertise of the additional members in the area of the search, and so on), as will be described in more detail As illustrated in FIG. 2, with some embodiments, for each search query that is processed by the search engine, the search engine 12 will store resulting data—in particular, the search results that resulted from a particular search query, and any user-selections—in a database 30. Once a sufficiently large data set for a particular period of time has been established, a data analysis module 32 is then used to identify the specific member profile attributes that are most highly correlated amongst the member profiles that are ultimately selected from a search results set, and the member profile of the member who has invoked a particular search. In this manner, the most highly correlated member profile attributes 34 are identified, and can be used in a ranking algorithm by the search results ranking module 26. With some embodiments, the ranking algorithm may be implemented to weight the various member profile attributes used in the ranking algorithm based on the level of correlation as determined by the data analysis module 32. For example, if the data shows that a searching member selects a member profile from the search results having a first member profile attribute (e.g., geographic location of residence) in common with his or her own member profile a particular percentage (e.g., seventy-five percent) of the time, and a second member profile attribute (e.g., the company at which the member is employed) in common with the searching member's profile some percentage of time lower than seventy-five, this information may be used to weight the significance of the two member profile attributes contribution to the overall ranking score. In any case, the data analysis module 32 is used to analyze historical search data 30 for the purpose of identifying the member profile attributes that are the best input signals for the ranking algorithm.

Figure 3:
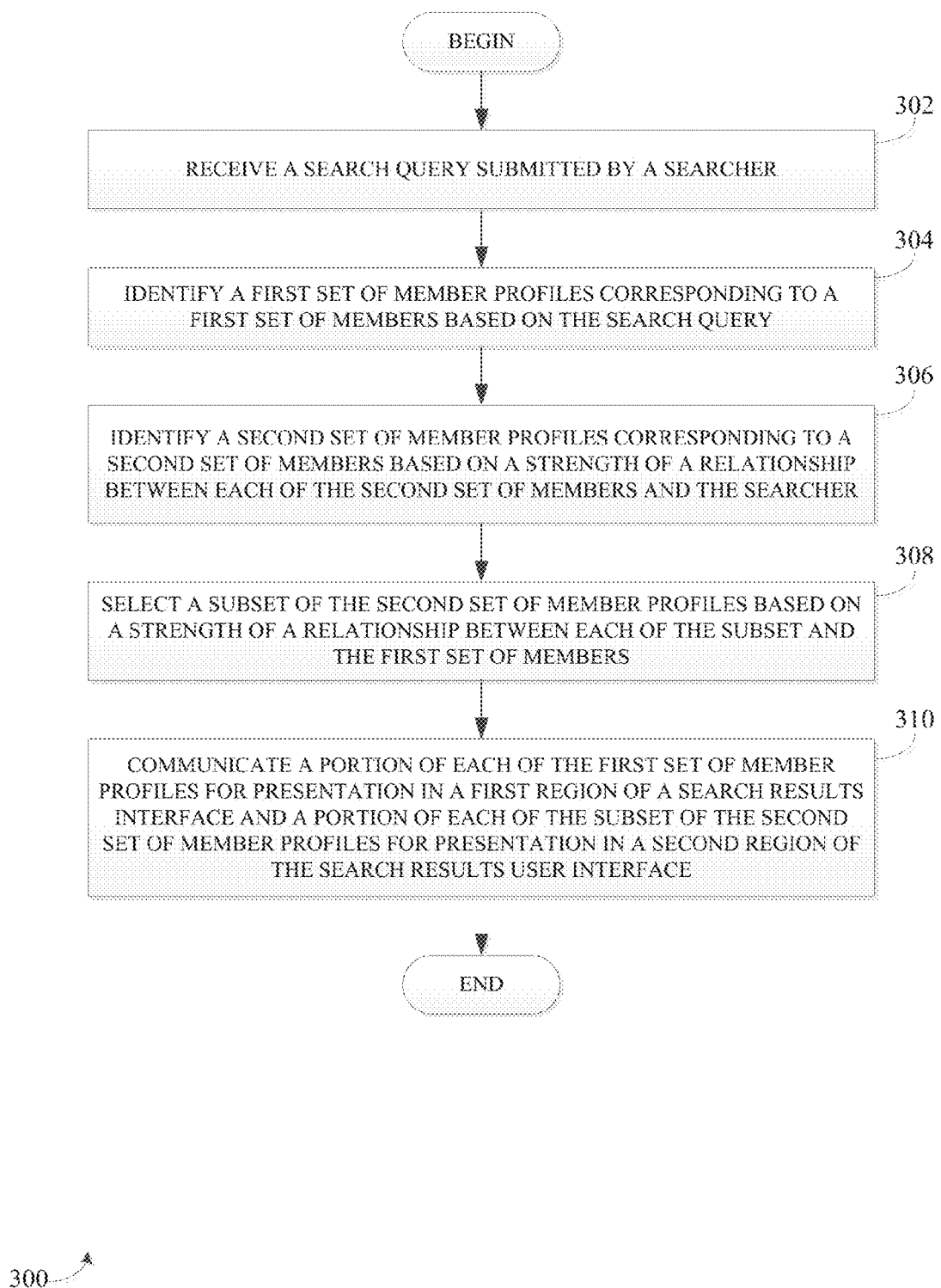
FIG. 3 is a flow diagram illustrating an example method of determining members of a social networking system who may have special knowledge pertaining to member profiles satisfying a search query initiated by a searcher.

FIG. 3 is a flow diagram illustrating an example method 300 of determining members of a social networking system who may have special knowledge pertaining to member profiles satisfying a search query initiated by a searcher. In various embodiments, the method 300 may be implemented by one or more of the modules depicted in FIG. 2.

At operation 302, the search engine receives a search query from a searcher (e.g., a member of the social network service initiating the search).

At operation 304, the search engine identifies a first set of member profiles. This identification of the first set of member profiles is based on each of the first set of member profiles satisfying the search query e.g., based on any of the criteria discussed above). This first set of member profiles corresponds to a first set of members of the social networking service.

At operation 306, the search engine identifies a second set of member profiles. This identification of the second set of member profiles is based on a strength of a relationship between each of the second set of member profiles and a member profile corresponding to the searcher. For example, this second set of member profiles may be identified based on a determination that each of the second set of member profiles is connected (e.g., as a first-degree connection) to the member profile of the searcher. This second set of member profiles corresponds to a second set of members of the social networking system.

At operation 308, the search engine selects a subset of the second set of member profiles. This selection is based on strengths of relationships between each member profile of the subset of the second set of members and each member profile of the first set of member profiles. :In various embodiments, the strength of the relationship between each member profile of the subset of the second set of members and each member profile of the first set of member profiles is based on a number of connections each member profile of the second set of member profiles has to the first set of member profiles. In various embodiments, the strength of the relationship may be based additionally or alternatively on any combination of weighted factors, such as a reputation of the member in the second set of members, an expertise of the member in the second set of members with respect to a subject matter of the search, and so on. Thus, in various embodiments, connections of the searcher (e.g., first-degree connections) are iterated over to identify a number of connections that each connection of the searcher has to members appearing in the search results. The connections of the searcher having the most connections to the search results are identified as the searcher's most influential connections with respect to the search results.

At operation 310, the search engine communicates a portion of each of the first set of member profiles for presentation in a first region of a search results interface (e.g., a search results region) and a portion of each of the subset of the second set of the member profiles for presentation in a second region of the search results user interface (e.g., a connections insight widget). Thus, a searcher may not only be presented with search results satisfying a query submitted by the searcher, but also information pertaining to a list of members of the social networking system that may provide additional insight into the search results that may not be apparent from the search results themselves. In various embodiments, for example, the searcher may be presented with information pertaining to a particular number of members (e.g., two members) of the social networking system most likely to have special knowledge pertaining to the member profiles of the members of the social networking system that are included in the search results. Such information may include information pertaining to connections that each of the two members has to each of the members included in the search results. The searcher may infer, then, that the connections of the two members may have special relevance to the search results, regardless of whether the connections of the two members appear in the search results themselves. Additionally, the searcher may identify the two members as potential contacts that the searcher may reach out to for more information that is specific to the search results.

Figure 4:
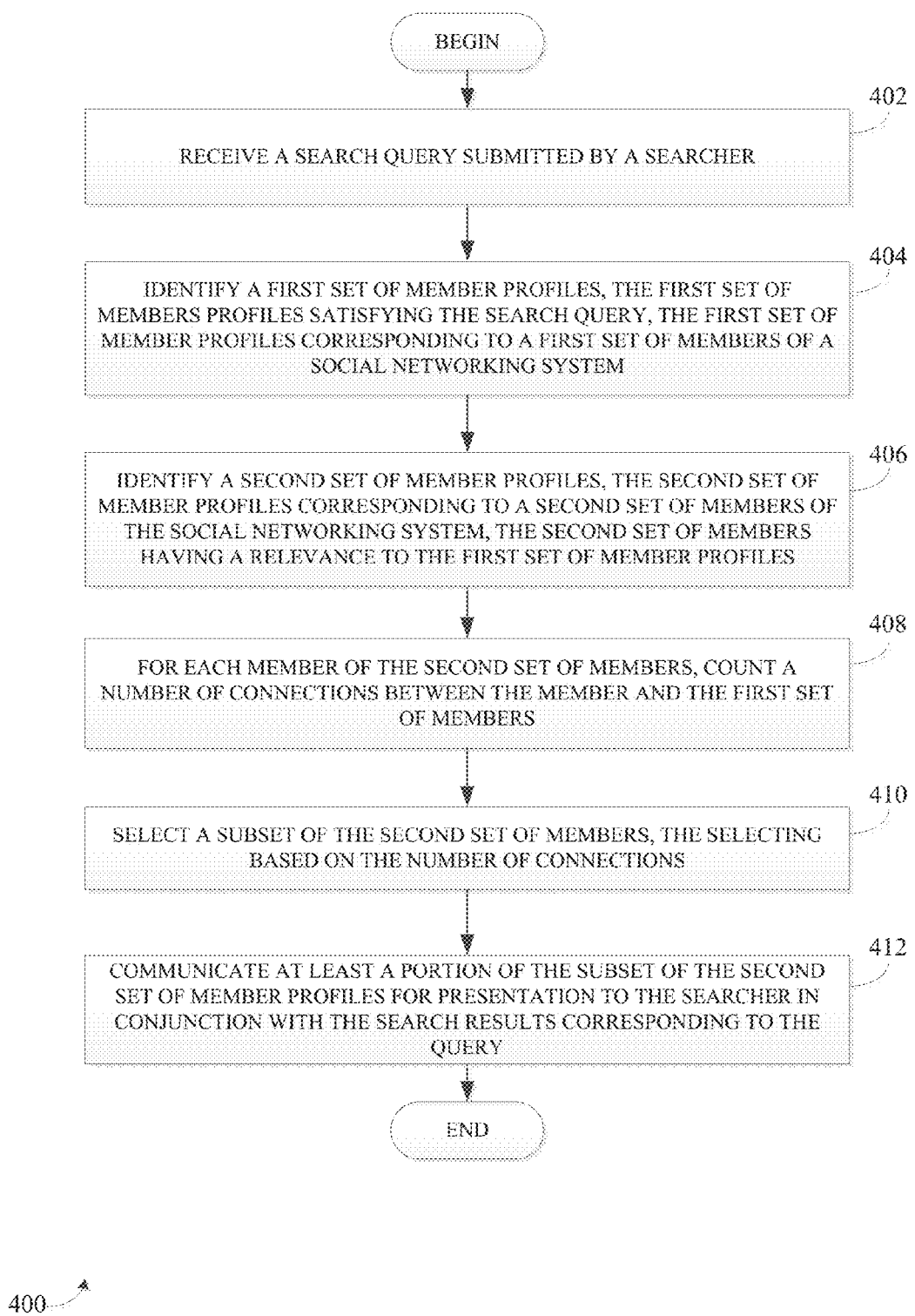
FIG. 4 is a flow diagram illustrating an additional example method of determining members of a social networking system who may have special knowledge pertaining to member profiles satisfying a search query initiated by a searcher.

FIG. 4 is a flow diagram illustrating an additional example method 400 of determining influential members of a social networking system who may have special knowledge pertaining to member profiles satisfying a search query initiated by a searcher. In various embodiments, the method 400 may be implemented by one or more of the modules depicted in FIG. 2.

At operation 402, the search engine receives a search query initiated by a searcher. At operation 404, a first set of member profiles is identified. In various embodiments, the first set of member profiles is identified based on the first set of member profiles satisfying the search query.

At operation 406, the search engine identifies a second set of member profiles. In various embodiments, the second set of member profiles is identified based on a relevance of the second set of member profiles to the first set of member profiles independently of whether the second set of member profiles satisfy the search query. For example, in various embodiments, each of the second set of member profiles may be identified based on a combination of various factors, such as whether the member profile is connected to a profile of the searcher, whether the member profile corresponds to an expert in a subject area pertaining to the query, whether the member profile is connected with member profiles satisfying the query, and so on.

At operation 408, for each member of the second set of members, the search engine calculates a number of connections between the member and the first set of members.

At operation 410, the search engine selects a subset of the second set of members based on the number of connections between each member of the second set of members and the first set of members. For example, the search engine selected a predetermined number of the second set of members having the highest number of connections to the first set of members, At operation 412, the search engine communicates at least a portion of the subset of the second set of members for presentation to the searcher in conjunction with a presentation of search results corresponding to the query.

Figure 5:
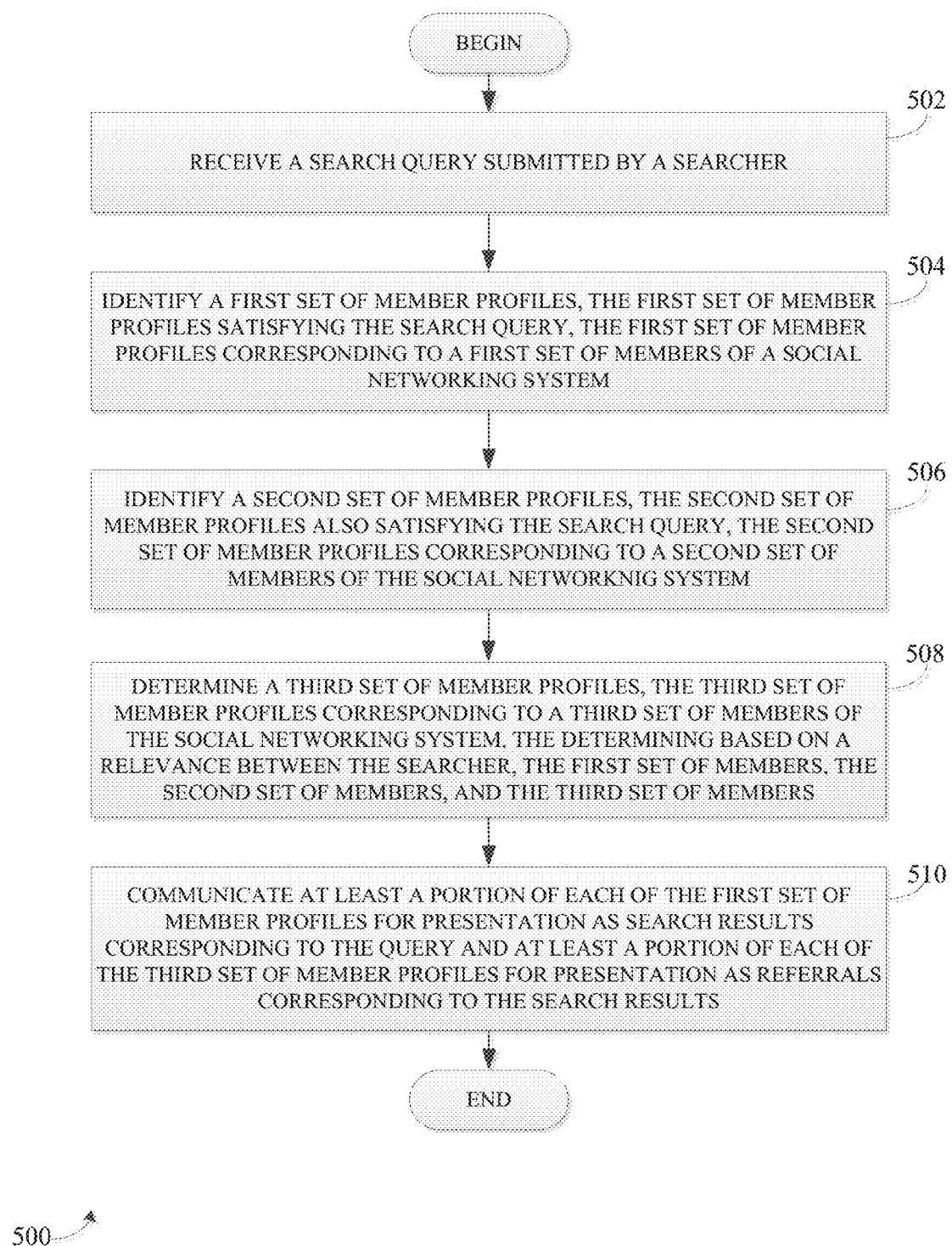
FIG. 5 is a flow diagram illustrating an example method of analyzing a superset of a first set of member profiles satisfying a search query to identify an additional set of member profiles having relevance to the first set of member profiles.

FIG. 5 is a flow diagram illustrating an example method 500 of analyzing a superset of first set of member profiles satisfying a search query to identify an additional set of member profiles having relevance to the first set of member profiles. In various embodiments, the method 500 may be implemented by one or more of the modules depicted in FIG. 2.

At operation 502, the search engine receives a search query submitted by a searcher. At operation 504, the search engine identifies a first set of member profiles. In various embodiments, this first set of member profiles is a predetermined number of member profiles that satisfy the search query (e.g., the top 25 member profiles satisfying the query based on the ranking criteria.)

At operation 506, the search engine identifies a second set of member profiles. In various embodiments, the second set of member profiles is an additional number of member profiles that satisfy the search query in addition to the member profiles identified at operation 504. For example, the second set of member profiles may be the member profiles ranked 26-50 based on an application of the rankings criteria.

At operation 508, the search engine identifies a third set of member profiles. In various embodiments, the third set of member profiles is identified based on any combination of a correspondence between a member profile of the searcher, member profiles of the first set of members, member profiles of the second set of members, and member profiles of the third set of member profiles. The correspondence may be identified based on strengths of relationships between the profiles, such as degrees of connections. Or the correspondence may be identified based on relevance of the profiles to each other based on an application of ranking criteria independent of whether the member profiles satisfy the search query.

At operation 510, the search engine communicates at least a portion of each of the first set of member profiles for presentation as search results corresponding to the query and at least a portion of each of the third set of member profiles for presentation as referrals corresponding to the search results. Thus, a superset of a predetermined number of member profiles satisfying the query may be used to identify additional member profiles corresponding to members who may have special knowledge pertaining to the search results.

Figure 6:
FIG. 6 is a screenshot of an example user interface for presenting search results corresponding to a query and additional information pertaining to members of a social networking system who may have special knowledge pertaining to the search results.

FIG. 6 is a screenshot of an example user interface 600 for presenting search results corresponding to a query and additional information pertaining to members of a social networking system who may have special knowledge pertaining to the search results. Here, a searcher has submitted a query including search results corresponding to a search query including the keywords "data scientist." A predetermined number of a set of search results satisfying the query are presented in a search results region of the user interface. For example, the top 5 ranked search results are presented in order based on an application of one or more ranking criteria. In a separate connection insights region (e.g., a connection insights widget) of the user interface, information pertaining to two members of the social networking system who may have special knowledge pertaining to the search results is presented. In various embodiments, these two members are identified based on their relationship to the searcher and the number of relationships each of the two members has with the members corresponding to the search results. Thus, Aishi Gupta is identified as a connection of the searcher who knows 15 candidates corresponding to member profiles appearing in the search results and Radhika Jhadev is identified as a connection of the searcher who knows 7 candidates corresponding to the member profiles appearing in the search results.

Figure 7:
FIG. 7 is a screenshot of an example user interface for presenting additional information corresponding to the search results that is accessible via the profiles of members of the social networking service who may have special knowledge pertaining to search results presented to a searcher.

FIG. 7 is a screenshot of an example user interface 700 for presenting additional information corresponding to the search results that is accessible via the profiles of members of the social networking service who may have special knowledge pertaining to search results presented to a searcher. Here, a searcher has clicked on a user interface element corresponding to the member profile of Aishi Gupta, who was identified as being a connection of the searcher who may have special knowledge pertaining to the query for "data scientist" entered by the searcher (e.g., as discussed above with respect to FIG. 6). The searcher is presented with information pertaining to member profiles of each of the connections of Aishi Gupta. In various embodiments, because of the various factors discussed above, these member profiles may have special significance to the searcher even though they don't appear at the top of the search results list corresponding to the query.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and Objects referred to herein may, in some example embodiments, comprise processor-implemented modules and/or objects, Similarly, the methods described herein may be at least partially processor-implemented. For example, at least sonic of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 8:
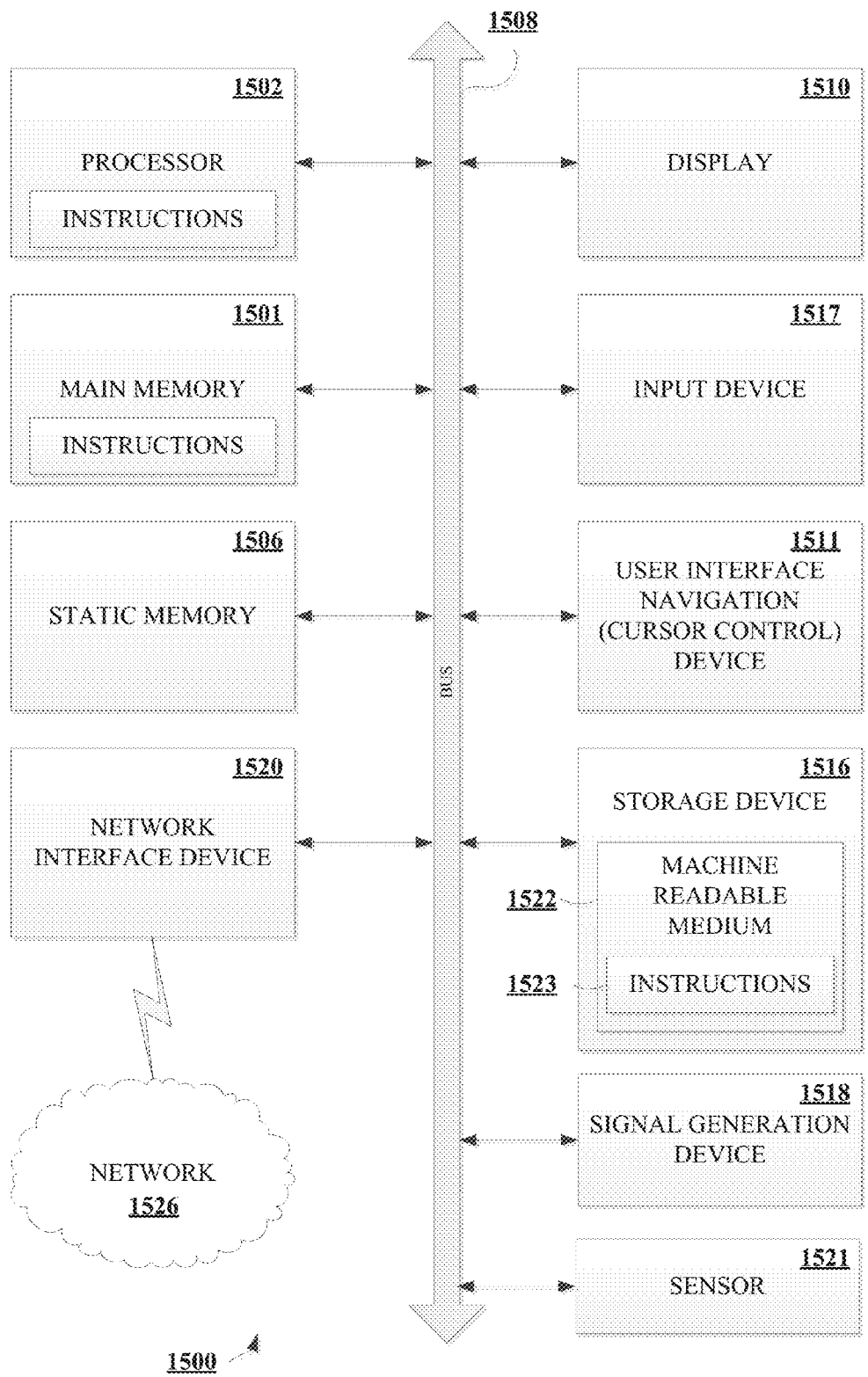
FIG. 8 is a block diagram of a machine in the form of a computing device within which a set of instructions, for causing the machine to perform any one or more of the methodologies discussed herein, may be executed.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)), FIG. 8 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
identifying a first set of member profiles, the identifying based on the first set of member profiles satisfying a search query initiated by the searcher, the first set of member profiles corresponding to a first set of members of a social networking service;
assigning a ranking score to each of the first set of member profiles based on a ranking algorithm, the ranking algorithm combining at least a first input and a second input, the first input representing a measure of relevance of each of the first set of member profiles to the search query and the second input representing a measure of relevance of each of the first set of member profiles to a member profile of the searcher;
communicating a portion of each of the first set of member profiles for presentation in a first region of a search results user interface;
identifying a second set of member profiles, the second set of member profiles corresponding to a second set of members of the social networking service, the identifying of the second set of member profiles based on a relevance of each of the first set of member profiles to each of the second set of member profiles and a strength of a relationship between the member profile of the searcher and each of the second set of member profiles, the second set of members representing influential connections of the searcher with respect to the search query initiated by the searcher;
applying a ranking criteria to the second set of members, the ranking criteria being independent of whether the second set of member profiles satisfy the search criteria;
selecting a subset of the second set of member profiles based on the ranking criteria, the subset including a predetermined number of the second set of member profiles ranked highest according to the ranking criteria; and
communicating a portion of each of the subset of the second set of member profiles for presentation in a second region of the search results user interface.

2. The method of claim 1, wherein the relevance of the first set of member profiles to each of the subset of the second set of member profiles is greater than a relevance of each of the first set of member profiles to each of the other members of the second set of members.

3. The method of claim 1, wherein the strength of the relationship between the member profiles of the searcher and each of the first set of members of the social networking system is based on a degree of connection between the member profile of the searcher and each of the first set of member profiles of the social networking system.

4. The method of claim 1, wherein the relevance of the first set of member profiles to each of the subset of the second set of member profiles is based on a number of connections between the first set of member profiles and each of the subset of the second set of member profiles.

5. The method of claim 4, wherein the strength of the relevance of the first set of member profiles to each of the subset of the second set of member profiles is further based on an expertise of each of the second set of members with respect to a subject matter of the search query.

6. The method of claim 1, wherein the selecting of the subset of the second set of member profiles is based on a superset of the first set of member profiles, the superset including a third set of member profiles, the third set of member profiles satisfying the search query, information pertaining to the third set of member profiles not to be communicated for presentation in the search results user interface.

7. The method of claim 4, wherein the portion of each of the subset of the second set of member profiles includes the number of the connections.

8. A system comprising:
one or more modules implemented by one or more processors, the one or more modules configured to:
identify a first set of member profiles, the identifying based on the first set of member profiles satisfying a search query initiated by the searcher, the first set of member profiles corresponding to a first set of members of a social networking service;
assign a ranking score to each of the first set of member profiles based on a ranking algorithm, the ranking algorithm combining at least a first input and a second input, the first input representing a measure of relevance of each of the first set of member profiles to the search query and the second input representing a measure of relevance of each of the first set of member profiles to a member profile of the searcher;
communicate a portion of each of the first set of member profiles for presentation in a first region of a search results user interface;
identify a second set of member profiles, the second set of member profiles corresponding to a second set of members of the social networking service, the identifying of the second set of member profiles based on a relevance of each of the first set of member profiles to each of the second set of member profiles and a strength of a relationship between the searcher and each of the second set of member profiles, the second set of members representing influential connections of the searcher with respect to the search query initiated by the searcher;
apply a ranking criteria to the second set of members, the ranking criteria being independent of whether the second set of member profiles satisfy the search criteria;
select a subset of the second set of member profiles based on the ranking criteria, the subset including a predetermined number of the second set of member profiles ranked highest according to the ranking criteria; and
communicate a portion of each of the subset of the second set of member profiles for presentation in a second region of the search results user interface.

9. The system of claim 8, wherein the relevance of the first set of member profiles to each of the subset of the second set of member profiles is greater than a relevance of each of the first set of member profiles to each of the other members of the second set of members.

10. The system of claim 8, wherein the strength of the relationship between the member profiles of the searcher and each of the first set of members of the social networking system is based on a degree of connection between the member profile of the searcher and each of the first set of member profiles of the social networking system.

11. The system of claim 8, wherein the relevance of the first set of member profiles to each of the subset of the second set of member profiles is based on a number of connections between the first set of member profiles and each of the subset of the second set of member profiles.

12. The system of claim 11, wherein the strength of the relevance of the first set of member profiles to each of the subset of the second set of member profiles is further based on an expertise of each of the second set of members with respect to a subject matter of the search query.

13. The system of claim 8, wherein the selecting of the subset of the second set of member profiles is based on a superset of the first set of member profiles, the superset including a third set of member profiles, the third set of member profiles satisfying the search query, information pertaining to the third set of member profiles not to be communicated for presentation in the search results user interface.

14. The system of claim 11, wherein the portion of each of the subset of the second set of member profiles includes the number of the connections.

15. A non-transitory computer-readable storage medium storing instructions thereon, which, when executed by one or more processors, cause the one or more processors to perform operations, the operations comprising:
- identifying a first set of member profiles, the identifying based on the first set of member profiles satisfying a search query initiated by the searcher, the first set of member profiles corresponding to a first set of members of a social networking service;
- assigning a ranking score to each of the first set of member profiles based on a ranking algorithm, the ranking algorithm combining at least a first input and a second input, the first input representing a measure of relevance of each of the first set of member profiles to the search query and the second input representing a measure of relevance of each of the first set of member profiles to a member profile of the searcher;
- communicating a portion of each of the first set of member profiles for presentation in a first region of a search results user interface;
- identifying a second set of member profiles, the second set of member profiles corresponding to a second set of members of the social networking service, the identifying of the second set of member profiles based on a relevance of each of the first set of member profiles to each of the second set of member profiles and a strength of a relationship between the member profile of the searcher and each of the second set of member profiles, the second set of members representing influential connections of the searcher with respect to the search initiated b the searcher;
- applying a ranking criteria to the second set of members, the ranking criteria being independent of whether the second set of member profiles satisfy the search criteria;
- selecting a subset of the second set of member profiles based on the ranking criteria, the subset including a predetermined number of the second set of member profiles ranked highest according to the ranking criteria; and
- communicating a portion of each of the subset of the second set of member profiles for presentation in a second region of the search results user interface.

16. The non-transitory computer-readable storage medium of claim 15, wherein the relevance of the first set of member profiles to each of the subset of the second set of member profiles is greater than a relevance of each of the first set of member profiles to each of the other members of the second set of members.

17. The non-transitory computer-readable storage medium of claim 15, wherein the strength of the relationship between the member profiles of the searcher and each of the first set of members of the social networking system is based on a degree of connection between the member profile of the searcher and each of the first set of member profiles of the social networking system.

18. The non-transitory computer-readable storage medium of claim 15, wherein the relevance of the first set of member profiles to each of the subset of the second set of member profiles is based on a number of connections between the first set of member profiles and each of the subset of the second set of member profiles.

19. The non-transitory computer-readable storage medium of claim 18, wherein the strength of the relevance of the first set of member profiles to each of the subset of the second set of member profiles is further based on an expertise of each of the second set of members with respect to a subject matter of the search query.

20. The non-transitory computer-readable storage medium of claim 15, wherein the selecting of the subset of the second set of member profiles is based on a superset of the first set of member profiles, the superset including a third set of member profiles, the third set of member profiles satisfying the search query, information pertaining to the third set of member profiles not to be communicated for presentation in the search results user interface.

* * * * *

UNITED STATES PATENT AND TRADEMARK OFFICE
CERTIFICATE OF CORRECTION

PATENT NO. : 9,648,131 B2  
APPLICATION NO. : 14/448966  
DATED : May 9, 2017  
INVENTOR(S) : Sundaram et al.

Page 1 of 1

It is certified that error appears in the above-identified patent and that said Letters Patent is hereby corrected as shown below:

In Column 17, Line 39, in Claim 15, after "search", insert --query--

In Column 17, Line 40, in Claim 15, delete "b" and insert --by-- therefor

Signed and Sealed this  
Fifth Day of June, 2018

Andrei Iancu  
*Director of the United States Patent and Trademark Office*